United States Patent [19]

Inada et al.

[11] Patent Number: 5,354,804
[45] Date of Patent: Oct. 11, 1994

[54] METHOD OF EMULSIFYING THERMOPLASTIC RESIN COMPOSITION

[75] Inventors: Jun Inada, Yokkaichi; Fumio Koshiro, Yamaguchi; Ryoichi Shimizu; Shinichi Sato, both of Yokkaichi, all of Japan

[73] Assignee: Tosoh Corporation, Shinnanyo, Japan

[21] Appl. No.: 117,348

[22] Filed: Sep. 7, 1993

Related U.S. Application Data

[63] Continuation of Ser. No. 936,058, Aug. 28, 1992, abandoned, which is a continuation of Ser. No. 697,367, May 9, 1991, abandoned.

[30] Foreign Application Priority Data

Jul. 23, 1991 [JP] Japan ................. 2-124175

[51] Int. Cl.$^5$ ............................................. C08L 29/04
[52] U.S. Cl. .................................... 524/503; 524/502; 524/557; 524/563; 524/585
[58] Field of Search .............. 524/502, 503, 557, 563, 524/585

[56] References Cited

U.S. PATENT DOCUMENTS

| | | | |
|---|---|---|---|
| 4,320,041 | 3/1982 | Abe et al. | 524/503 |
| 4,476,266 | 10/1984 | Maeda et al. | 524/128 |
| 4,639,473 | 1/1987 | Wingler et al. | 525/83 |
| 4,657,975 | 4/1987 | Kodama et al. | 525/74 |
| 4,731,266 | 3/1988 | Bonnebat et al. | 428/35 |

FOREIGN PATENT DOCUMENTS

| | | |
|---|---|---|
| 51-12835 | 1/1976 | Japan . |
| 5842207 | 1/1977 | Japan . |
| 52-13539 | 2/1977 | Japan . |
| 6229447 | 12/1980 | Japan . |
| 56-2149 | 1/1981 | Japan . |

*Primary Examiner*—Paul R. Michl
*Assistant Examiner*—John J. Guarriello
*Attorney, Agent, or Firm*—Armstrong, Westerman, Hattori, McLeland & Naughton

[57] ABSTRACT

A thermoplastic resin is emulsified by feeding a thermoplastic resin composition obtained by melting and mixing 80 to 98 wt. % of the resin with 2 to 20 wt. % of poly(vinyl alcohol) in a biaxial extruder, supplying water from at least one supply port downstream from the melting zone and kneading the molten composition with water in the biaxial extruder.

9 Claims, 2 Drawing Sheets 1-1

1-2

1-3

1-4

1-4

1-3

1-2

1-1

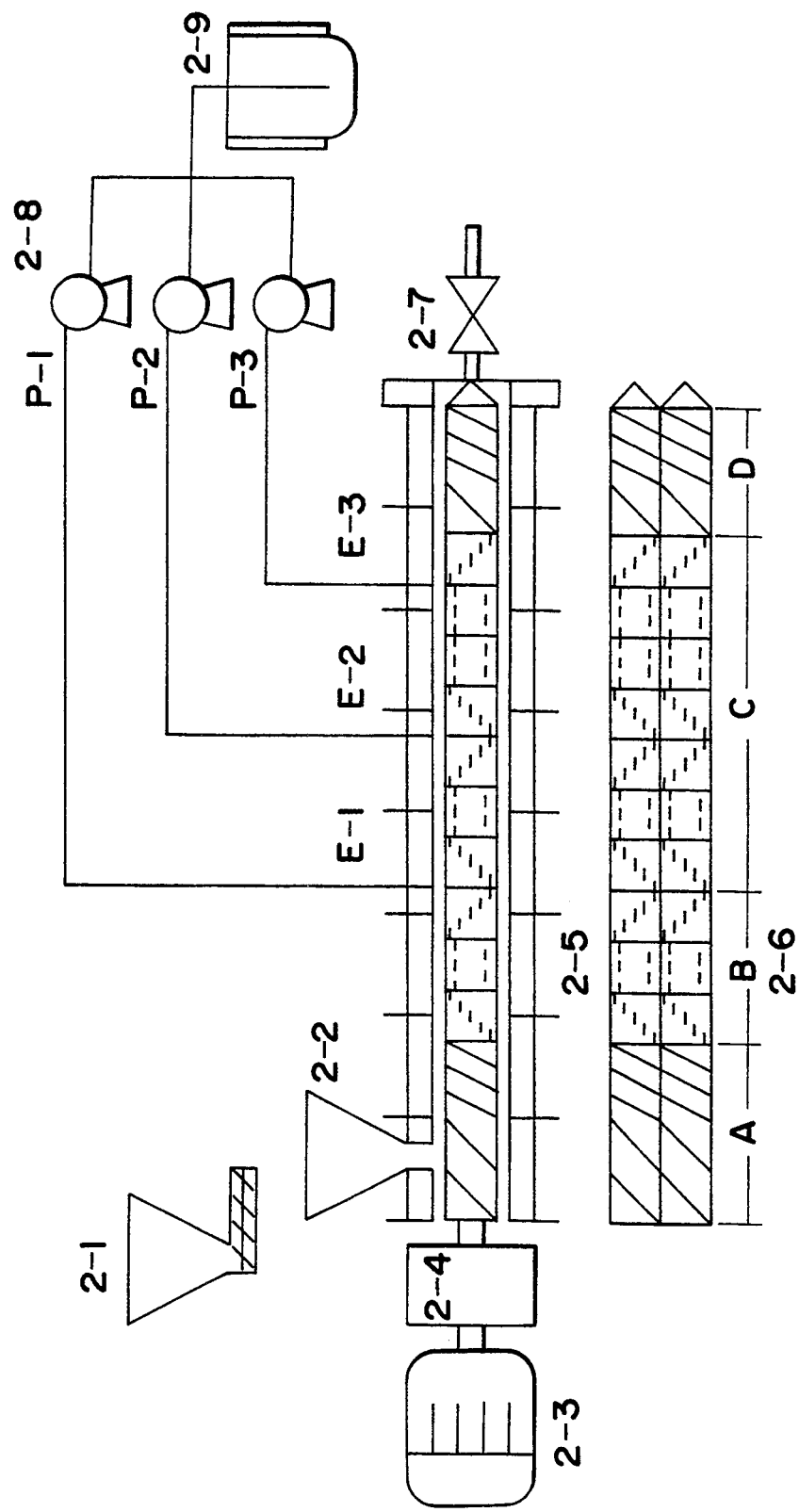

METHOD OF EMULSIFYING THERMOPLASTIC RESIN COMPOSITION

This application is a continuation of application Ser. No. 07/936,058 filed Aug. 28, 1992, now abandoned, which is a continuation of application Ser. No. 07/697,367 filed May 9, 1991 now abandoned.

BACKGROUND OF THE INVENTION

The present invention relates to an industrial and inexpensive method of producing powder and emulsion of thermoplastic resin.

There are several methods as the methods of producing powder and emulsion of thermoplastic resin. Production methods of powder represented by mechanical pulverization and chemical pulverization and production methods of emulsion represented by emulsification polymerization, suspension polymerization and post-emulsification are included.

In the production methods of powder, the mechanical pulverization can be said to be an inexpensive production method, but has drawbacks of relatively large particle diameter and poor particle shape.

Whereas, the chemical pulverization is said to give relatively small particle diameter and also good particle shape, but has drawbacks of high cost and potential of environmental pollution because of the use of large quantities of organic solvent.

Moreover, in the production methods of emulsion, polymers represented by ethylene-vinyl acetate copolymer, which can be obtained through the emulsification polymerization or suspension polymerization, have generally only low ethylene content. Polymers with ethylene content over 50 wt. % require a high-pressure process of reaction pressure of several hundreds kg/cm$^2$ or more, which is substantially difficult in practice from the aspects of cost and safety, and the upper limit of ethylene content of ethylene-vinyl acetate copolymer obtainable by such methods is said to be 40 wt. %.

On the contrary, the post-emulsification method is excellent as a method of emulsifying high-olefin content polymers, since the thermoplastic resin being usually solid is dispersed into water in the subsequent process.

With respect to the post-emulsification process, too, cases with using solvent and without using it are conceivable. The former is a method wherein a solution dissolved thermoplastic resin into a suitable organic solvent is mixed and emulsified with an aqueous solution of emulsifier and then the solvent is collected. According to this method, the emulsification of thermoplastic resin with relatively high molecular weight is possible, but the collection of solvent is difficult also technically, hence this can be said to be a production method of low productivity and high cost. Also, this is unpreferable from the point of environmental problem.

With respect to the latter method, a method wherein a composition of polyolefin and carboxyl group-containing polyolefin is brought to a molten state and a basic substance and the composition are dispersed into water at 140° to 300° C. (for example, Japanese Patent Publication No. Sho 58-42207) is proposed. This is excellent in the point that the physical properties of resin are not injured because of no use of emulsifier, but specific in the point that, unless carboxyl group-containing polyolefin is used, sufficient effect cannot be expected. Moreover, upon producing fine particles, the effect of melt viscosity is significant and the process requires high temperature and high pressure, thus this method is unsuitable for emulsifying relatively high-molecular weight resin and disadvantageous also from the aspect of energy. Further, as an another method, a method wherein an olefinic resin and an aqueous solution of partially saponified poly(vinyl alcohol) are kneaded moltenly in a multiaxial extruder to produce an aqueous dispersion (for example, Japanese Patent Publication No. Sho 62-29447) is proposed. In this method, the partially saponified poly(vinyl alcohol) to be used is restricted to one with high polymerization degree from the fact that, unless an aqueous solution of partially saponified poly(vinyl alcohol) with high viscosity is used, fine particles cannot be obtained. Moreover, the preparation of aqueous solution of partially saponified poly(vinyl alcohol) with high viscosity is a difficult work and feeding this into extruder is also accompanied with difficulty. Furthermore, in this method, unless the aqueous solution is fed into the compression zone of multiaxial extruder, fine particles cannot be obtained. The screw of multiaxial extruder having compression zone is very special and not used universally.

Different from such conventional methods, the invention lies in that, only by supplying water on the way of general purpose biaxial extruder, very stable aqueous dispersion of thermoplastic resin can be produced continuously, inexpensively and easily without using specific emulsifier or dispersant.

As a result of extensive investigations in view of the status quo aforementioned, the inventors have found that, by using a thermoplastic resin composition moltenly mixed general purpose poly(vinyl alcohol) with thermoplastic resin, very stable aqueous dispersion of thermoplastic resin can be produced continuously, inexpensively and easily, leading to the completion of the invention.

SUMMARY OF THE INVENTION

The invention relates to a method of emulsifying a thermoplastic resin composition characterized in that a thermoplastic resin composition obtained by melting and mixing 80 to 98 wt. % thermoplastic resin with 2 to 20 wt. % poly(vinyl alcohol) is fed from the hopper of biaxial extruder and water is supplied from at least one supply port provided downstream from the melting zone of composition to knead moltenly with said composition.

BRIEF DESCRIPTION OF THE DRAWING

FIG. 2 is an outline of the biaxially extruding equipment, which is one example of the case injecting water from three locations.

DETAILED DESCRIPTION OF THE INVENTION

In following, the invention will be illustrated in detail.

The biaxial extruder to be used in the invention may be a generally usable biaxial extruder, if it has at least one or more supply ports of water downstream from the melting zone of said composition and exerts high shear force. The direction of rotation also does not matter if the axes rotate in the same direction or in different direction.

Figure 1:
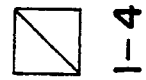
FIG. 1 shows disc types of the screw segment of biaxial extruder.
Figure 1:
Figure 1:
Figure 1:

FIG. 1 shows disc types of screw, wherein numerals 1-1, 1-2, 1-3 and 1-4 are forward kneading disc, backward kneading disc, neutral kneading disc and flight disc, respectively. FIG. 2 shows a biaxially extruding equipment for emulsification, wherein numerals 2-1, 2-2, 2-3, 2-4, 2-5, 2-6, 2-7, 2-8 and 2-9 are feeder, hopper, motor, gear box, cylinder (with heating device), screw, nozzle, plunger pump and heated water bath, respectively, and in the constitution of screw 2-6, A, B, C and D are feed zone, melting zone, kneading zone and metering zone, respectively. Moreover, E-1, E-2 and E-3 are injection ports of water. The melting zone so said here means a kneading disc section to be used for melting resin in the constitution of screw from the hopper to the first injection port E-1 and the temperature of resin must be at least not lower than the melting point. Also, the kneading zone means a section from the first injection port to the last kneading disc in the constitution of screw.

The resin is fed in a fixed quantity from feeder, completely molten in the melting zone B, then forcedly kneaded with water supplied in a fixed quantity in the kneading zone C having one or more liquid-injecting inlets to emulsify, and metered in the section D to obtain the product continuously.

Particularly preferable is a biaxial extruder of the type having double or triple thread kneading discs with L/D of not less than 20 and being easily changeable the dimension of screw. The constitution of screw with combined discs of flight type and kneading type as shown in FIG. 1 is preferable and the constitution allowing to become forward/neutral/backward for each of melting zone and kneading zone is preferable. Moreover, the location for supplying water is preferable to be a strong kneading section on the kneading disc in the kneading zone and the rate of kneading disc subsequent to the first water injection port requires at least not less than 10 % of L/D. The L/D used here is a value of the length L divided by the diameter D of screw.

As the thermoplastic resins to be used in the invention, for example, sole material or mixtures in arbitrary proportion of low-density polyethylene, medium-density polyethylene, high-density polyethylene, linear low-density polyethylene, ethylene-vinyl acetate copolymer, fully or partially saponified ethylene-vinyl acetate copolymer, ethylene-acrylic acid copolymer, various metal salts of ethylene-acrylic acid copolymer, ethylene-methacrylic acid copolymer, ethylene-acrylic ester copolymer, ethylene-acrylic ester-maleic anhydride terpolymer, ethylene-methacrylic ester copolymer, polypropylene, random or block copolymer of ethylene-propylene, ethylene-propylene-α-olefin terpolymer, polystyrene, etc. can be mentioned. Further, small quantity of additives, for example, at least one or more of rosin, petroleum resin, polyamide, wax, surfactant, etc. may be used in combination for various purposes.

Poly(vinyl alcohol) to be used in the invention means a product fully or partially saponified poly(vinyl acetate) and may be general purpose one used for the usual emulsification polymerization. The polymerization degree is preferable to be within a range of 200 to 2000. Moreover, particularly preferable is partially saponified poly(vinyl alcohol) and the saponification degree is preferable to be 65 to 95 tool %. If the saponification degree is under 65 tool %, sufficient emulsification is impossible and stable aqueous dispersion cannot be obtained.

The thermoplastic resin composition to be used in the invention means a melt mixture of said thermoplastic resin with poly(vinyl alcohol). The mixing rate of thermoplastic resin with poly(vinyl alcohol) is within a range of 80 to 98 wt. % thermoplastic resin and 2 to 20 wt. % poly(vinyl alcohol). If poly(vinyl alcohol) is under 2 wt. %, the emulsification does not take place and aqueous dispersion cannot be obtained. Also, if over 20 wt. %, not only the water resistance decreases remarkably when the aqueous dispersion is made into a heat-dried film, but also the cost becomes high, which is unpreferable.

Moreover, the methods of feeding thermoplastic resin composition into the emulsifying biaxial extruder include, for example, a method of feeding after melted and mixed previously in a separate process, a method of feeding after dry blended thermoplastic resin with poly(vinyl alcohol), a method of feeding after dry blended small quantity of a melt mixture of thermoplastic resin with poly(vinyl alcohol) at high concentration with thermoplastic resin, and the like. In all cases, the composition is fed into the hopper of the emulsifying biaxial extruder and may be safe if it is melted and mixed completely in the melting zone B.

Furthermore, as the method of melting and mixing thermoplastic resin with poly(vinyl alcohol), a biaxial extruder having a strong kneading section is preferable from the point of dispersibility and the melting and mixing temperature is particularly preferable to be within a range of 190° to 220° C. being over the melting point of poly(vinyl alcohol) and under the decomposition temperature, though not restricted if poly (vinyl alcohol) disperses enough.

In the invention, the injection ports of water are one or more, and two or more ports are particularly preferable. The reason of supplying at two or more ports is because of that the difference in viscosity is large between molten resin and water and, if supplying in large quantity at one port, the slip ends up to be caused between screw and resin resulting in the difficult kneading. This tendency is remarkable in the case of resin with high melt viscosity and, based on the fact that even a resin with high melt viscosity incapable of emulsifying by injecting at one port can be emulsified by supplying at two or more ports, it is preferable to add the injection port with an increase in melt viscosity. Moreover, as an another effect, an emulsion with smaller particle diameter can be produced stably. The reason of this phenomenon is not necessarily clear, but it is presumed that, due to the multistage injection of water, W/O type emulsion will be produced first and thereafter the phase reversion to O/W type emulsion will progress stepwise. Such presumption however does not restrict the invention in any way.

As for the temperature of water to be supplied to the biaxial extruder, the smaller the temperature difference from molten resin, more preferable, and the same temperature as that of molten resin is further preferable. If the temperature of supply water is too low, the molten resin ends up to be cooled rapidly at the water-injecting portion resulting in the high melt viscosity, difficult emulsification and poor particle shape as well. Moreover, when the emulsification at high temperature is required for reducing melt viscosity, for emulsifying high-melting point resin, or the like, it is unpreferable to raise the temperature of water beyond the necessity for the use of pressurized hot water, since the equipment becomes large scale.

Further, when emulsifying acid copolymer such as acrylic acid, an aqueous solution used appropriate quantity of base for neutralizing acid may be safely supplied to the extruder in place of water to be supplied. Moreover, when emulsifying a resin with high melt viscosity, an aqueous solution of water-soluble high molecular compounds with high viscosity such as sodium polyacrylate and carboxymethylcellulose may be safely supplied in place of water for preventing the slip between screw and resin.

In the invention, the ratio of water to thermoplastic resin composition to be fed into the biaxial extruder is preferable to be 5 to 20 parts by weight of water and more preferable to be within a range of 10 to 15 parts by weight of water per 100 parts by weight of resin composition when injecting at one port. If under 5 parts by weight, the phase reversion of emulsion does not take place and the product cannot be obtained. Also, if over 20 parts by weight, the supply level of water is too much and the slip ends up to be caused between resin and screw making it impossible to knead and to emulsify. When injecting at two or more ports, however, the supply level of water can be varied significantly over the case of supplying at one port. The level is preferable to be 5 to 200 parts by weight of water and more preferable to be within a range of 10 to 100 parts by weight of water per 100 parts by weight of resin. If under 5 parts by weight, the phase reversion of emulsion does not take place and the produce cannot be obtained. Also, if over 200 parts by weight, the emulsion produced becomes low solids, which is unuseful industrially.

In this way, the emulsion of thermoplastic resin can be produced continuously, easily and inexpensively.

Moreover, by drying the emulsion obtained in such way by the method such as spray drying, the powder of thermoplastic resin can also be obtained.

In following, the examples of the invention and the comparative examples corresponding thereto will be illustrated, but the invention is never restricted to these.

REFERENTIAL EXAMPLE

As a method of melting and mixing thermoplastic resin composition, a biaxial extruder (made by Kobe Steel Corp.: 2NCM granulating machine) was used to granulate under the conditions of the temperature of molten resin becoming to be 190° C.

EXAMPLE 1

A composition of 90 wt. % ethylene-vinyl acetate copolymer (made by Tosoh Corp.: Ultrathene UE720, content of vinyl acetate: 8 wt. %, melt flow rate (190° C.): 150 g/10 min) and 10 wt. % poly(vinyl alcohol) (made by Nihon Gohsei Kagaku Kogyo Co.: Gohsenol KL-05) mixed according to Referential example was fed at 10 kg/h into the hopper of biaxial extruder (made by Kobe Steel Corp.: KTX-37, L/D=30). From a plunger pump P-1 of numerals 2-8 in the diagram, water of 90° C. was supplied at 1 kg/h. The extrusion was performed at a heating temperature of 120° C. (cylinder temperature to the first liquid injection), a kneading temperature of 90° C. (cylinder temperature after the first liquid injection) and a number of revolutions of 250 rpm. As a result, milky white solid was obtained. This solid was dispersed into water using homogenizer and adjusted so as the solids to become 50 wt. % to obtain the product.

Evaluation was made about each item of the average particle diameter and stability of the product thus obtained and the external appearance and water resistance of the heat-dried film, the results of which are summarized in Table 1.

The measurement of average particle diameter was performed using SK Laser Micron Sizer (made by Seishin Kigyo Co.) being a laser diffraction type measuring apparatus of particle size distribution.

For the stability, 100 cc of emulsion were sampled into a flat-bottomed test tube with an inner diameter of 25 mm $\phi$ and, after closed with stopper so as the moisture not to evaporate, the test tube was allowed to stand stationarily for a week at room temperature. After the stationary standing, such one that did not separate into emulsion layer and aqueous layer was marked with ○ and, as for one caused phase separation, the rate of separated aqueous layer to overall volume was expressed in percentage.

For the preparation of heat-dried film, a slide glass was coated with a fixed quantity of emulsion and dried at a temperature 20° C. or more higher than the melting point of resin until the moisture was eliminated completely to obtain a continuous film.

The external appearance was determined by visually observing this film whether it is an even continuous film or not, and good and poor one were indicated with ○ and ×, respectively.

Moreover, as for the water resistance, the heat-dried film was immersed into water for 30 minutes and then it was dried at room temperature to observe the external appearance similarly.

EXAMPLE 2

Except that a dry blend of 80 wt. % ethylene-vinyl acetate copolymer (made by Tosoh Corp.: Ultrathene UE710, content of vinyl acetate: 28 wt. %, melt flow rate: 18 g/10 min) and 20 wt. % poly(vinyl alcohol) (made by Nihon Gohsei Kagaku Kogyo Co.: Gohsenol KM-11) was fed into the hopper of biaxial extruder, the extrusion was performed by the quite same procedure as in Example 1 to obtain milky white solid. This solid was dispersed into water using homogenizer and adjusted so as the solids to become 50 % to obtain the product.

EXAMPLE 3

Into the hopper of biaxial extruder (made by Kobe Steel Corp.: KTX-37, L/D=30), a composition of 90 wt. % ethylenevinyl acetate copolymer (made by Tosoh Corp.: Ultrathene UE751, content of vinyl acetate: 28 wt. %, melt flow rate: 6 g/10 rain) and 10 wt. % poly(vinyl alcohol) (made by Nihon Gohsei Kagaku Kogyo Co.: Gohsenol KL-05) mixed according to Referential example was fed at 10 kg/h. From plunger pumps P-1, P-2 and P-3 of numerals 2-8 in the diagram, water of 90° C. was supplied at 0.5 kg/h, 0.7 kg/h and 5 kg/h, respectively. The extrusion was performed at a heating temperature of 160° C. (cylinder temperature to the first liquid injection), a kneading temperature of 90° C. (cylinder temperature after the first liquid injection) and a number of revolutions of 250 rpm. As a result, milky white liquid was obtained. This liquid was dispersed into water using homogenizer and adjusted so as the solids to become 50 wt. % to obtain the product.

EXAMPLE 4

Except that a composition of 98 wt. % ethylene-acrylic acid copolymer (made by Dow Chemical Corp.: Primacol 3460, content of acrylic acid: 9 wt. %, melt flow rate: 20 g/10 rain) and 2 wt. % poly(vinyl alcohol) (made by Kuraray Corp.: PVA-110) moltenly mixed according to Referential example was fed into the hopper of biaxial extruder and 10 wt. % aqueous solution of sodium hydroxide was used in place of water to be supplied into extruder, the extrusion was performed by the quite same procedure as in Example 3 to obtain milky white solid. This solid was dispersed into water using homogenizer and adjusted so as the solids to become 50 wt. % to obtain the product.

EXAMPLE 5

Except that a composition of 90 wt. % low-density polyethylene (made by Tosoh Corp.: Petrothene 356, melt flow rate: 100 g/10 rain, density: 0.914 g/cm$^3$) and 10 wt. % poly(vinyl alcohol) (made by Kuraray Corp.: PVA-110) mixed according to Referential example was fed into the hopper of biaxial extruder, the extrusion was performed by the quite same procedure as in Example 3 to obtain milky white liquid. This liquid was dispersed into water using homogenizer and adjusted so as the solids to become 50 wt. % to obtain the product.

EXAMPLE 6

Except that a composition of 90 wt. % partially saponified ethylene-vinyl acetate copolymer (made by Tosoh Corp.: Melthene H-6410, melt flow rate: 16 g/10 rain) and 10 wt. % poly(vinyl alcohol) (made by Kuraray Corp.: PVA-205) mixed according to Referential example was fed into the hopper of biaxial extruder, the extrusion was performed by the quite same procedure as in Example 3 to obtain milky white liquid. This liquid was dispersed into water using homogenizer and adjusted so as the solids to become 50 wt. % to obtain the product.

COMPARATIVE EXAMPLE 1

Except that a composition of 99 wt. % ethylene-vinyl acetate copolymer (made by Tosoh Corp.: Ultrathene UE720) and 1 wt. % poly(vinyl alcohol) (made by Nihon Gohsei Kagaku Kogyo Co.: Gohsenol KL-05) mixed according to Referential example was fed into the hopper of biaxial extruder, the extrusion was performed by the quite same procedure as in Example 1 to obtain milky white solid. When attempted to disperse this solid into water using homogenizer, the dispersion did not take place.

COMPARATIVE EXAMPLE 2

Except that water was supplied to the middle of the melting zone B in the diagram, that is, to the location of resin being in the state of half melt by plunger pump, the extrusion was performed by the quite same procedure as in Example 1. However, the slip was cuased between resin and screw making sufficient kneading impossible, thus the product could not be obtained.

COMPARATIVE EXAMPLE 3

Except that an uniaxial extruder (Placo Co.: 50 mm$\phi$) was used in place of biaxial extruder, the extrusion was performed by the quite same procedure as in Example 1. However, the slip was caused between resin and screw making sufficient kneading impossible, thus the product could not be obtained.

COMPARATIVE EXAMPLE 4

Except that a composition of 75 wt. % ethylene-vinyl acetate copolymer (made by Tosoh Corp.: Ultrathene UE751) and 25 wt. % poly(vinyl alcohol) (made by Nihon Gohsei Kagaku Kogyo Co.: Gohsenol KL-05) mixed according to Referential example was fed into the hopper of biaxial extruder, the extrusion was performed by the quite same procedure as in Example 3 to obtain milky white liquid. This liquid was dispersed into water using homogenizer and adjusted so as the solids to become 50 wt. % to obtain the product.

COMPARATIVE EXAMPLE 5

Except that ethylene-vinyl acetate copolymer (made by Tosoh Corp.: Ultrathene UE720) was fed into the hopper of biaxial extruder at 10 kg/h and 10 wt. % aqueous solution of poly(vinyl alcohol) (made by Nihon Gohsei Kagaku Kogyo Co.: Gohsenol KH-20) was supplied at 5 kg/h in place of water, the extrusion was performed by the quite same procedure as in Example 1 to obtain milky white liquid. This liquid was dispersed into water using homogenizer and adjusted so as the solids to become 50 wt. % to obtain the product.

| Evaluation item | Average particle diameter ($\mu$) | Stability (%) | Heat-dried film External appearance | Water resistance |
|---|---|---|---|---|
| Example 1 | <1 | | | |
| Example 2 | 1.2 | | | |
| Example 3 | 1.6 | 0.5 | | |
| Example 4 | 1.3 | | | |
| Example 5 | 1.6 | 0.5 | | |
| Example 6 | <1 | | | |
| Comparative example 1 | — | — | — | — |
| Comparative example 2 | — | — | — | — |
| Comparative example 3 | — | — | — | — |
| Comparative example 4 | 1.2 | | | X |
| Comparative example 5 | 6.2 | 4.5 | X | |

As evident from the description above, in accordance with the invention, any specially shaped screw is not required and, only by supplying water into a general purpose biaxial extruder, the emulsion of thermoplastic resin can be obtained continuously and easily. Further, from the facts that high temperature and high pressure are not required and organic solvent is also not used, the invention is advantageous also from the points of energy and environmental pollution, permits a safe and low-cost process and can provide inexpensive emulsion of thermoplastic resin.

What is claimed is:

1. A method of emulsifying a thermoplastic resin composition which consists of:
   feeding a thermoplastic resin composition consisting of a mixture of 80 to 98 wt % of a thermoplastic resin and 20 to 2 wt % of polyvinyl alcohol into a biaxial extruder through a hopper thereof,
   melting the thermoplastic resin composition in the biaxial extruder to give a molten thermoplastic resin composition in the biaxial extruder,
   adding water only to the molten thermoplastic resin composition in the biaxial extruder, and
   kneading the water with the molten thermoplastic resin composition in the biaxial extruder.

2. A method according to claim 1, wherein the water is added to the molten thermoplastic resin composition at one location in the biaxial extruder.

3. A method according to claim 2, wherein 5 to 20 parts by weight of water are added per 100 parts by weight of the molten thermoplastic resin composition.

4. A method according to claim 1, wherein the water is added to the molten thermoplastic resin composition at more than one location in the biaxial extruder.

5. A method according to claim 4, wherein 5 to 200 parts by weight of water are added per 100 parts by weight of the molten thermoplastic resin composition.

6. A method according to claim 1, wherein the polyvinyl alcohol is fully or partially saponified polyvinyl acetate having a degree of polymerization of 200 to 2000.

7. A method according to claim 1, wherein the thermoplastic resin composition is prepared by mixing and melting the thermoplastic resin with the polyvinyl alcohol prior to being fed to the biaxial extruder.

8. A method according to claim 1, wherein the thermoplastic resin composition is prepared by first melting a portion of the thermoplastic resin with the polyvinyl alcohol and then blending with the thermoplastic resin to form the mixture containing 80 to 98 wt % of the thermoplastic resin and 20 to 2% of the polyvinyl alcohol.

9. A method according to claim 1, wherein the molten thermoplastic resin composition is prepared by melting a dry-blend of the thermoplastic resin and the polyvinyl alcohol in the biaxial extruder.

* * * * *